Patented Oct. 20, 1942

2,299,477

UNITED STATES PATENT OFFICE 2,299,477

HALOGENATION OF DIOLEFINS HAVING CONJUGATED DOUBLE BONDS

George W. Hearne, Berkeley, and Donald S. La France, Walnut Creek, Calif., assignors to Shell Development Company, San Francisco, Calif., a corporation of Delaware No Drawing. Application October 30, 1939, Serial No. 302,026

10 Claims. (Cl. 260—654)

This invention relates to the halogenation of non-aromatic polyolefins, and pertains more particularly to a novel process for the partial halogenation, via addition, of diene hydrocarbons.

Although the invention includes the partial halogenation of non-aromatic, cyclic and acyclic diolefinic hydrocarbons, it is of particular commercial value as applied to the halogenation of butadiene and of its homologues, in which the double bonds are conjugated. The invention includes an improved method for the partial halogenation, such as chlorination and/or bromination, of dienes, and especially of butadiene-1,3 and its homologues having the general formula $$(R_1)(R_2)-C=C(R_3)-C(R_4)=C(R_5)(R_6)$$

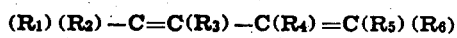

in which $R_1$, $R_2$, $R_3$, $R_4$, $R_5$, and $R_6$ are hydrogen or alkyl, aryl or aralkyl groups or radicals. Also, the invention includes the partial halogenation, via addition, of cyclic, non-aromatic, poly-olefins.

In one of its most specific embodiments the invention provides an improved process of halogenating butadiene-1,3, via addition, to produce relatively high yields of certain hereinbelow specified dihalo-butenes, while avoiding the formation of saturated halogenated butanes.

The addition of a halogen, such as bromine or chlorine, to butadiene has been known for some time. Griner, Compt. Rend. v. 116, page 723 (1893), and v. 117, page 553 (1893), Thiele, Ann. v. 308, page 333 (1899) and Farmer et al., J. Chem. Soc., page 729 (1928), studied the addition of bromine to butadiene; while Muskat et al., J. Am. Chem. Soc., v. 51, p. 2496, and v. 52, pages 326, 812 and 1574, disclosed various conditions relating to the study of halogen (and particularly chlorine) addition to diene hydrocarbons. In all of these cases the halogen additions were attempted or realized in the liquid phase, and particularly in the presence of an inert solvent or diluent, such as carbon disulfide, chloroform, etc. This is particularly disclosed and claimed in the Muskat U. S. Patent No. 2,038,593, according to the teaching of which the partial halo-addition reaction is effected at a temperature of an ice-salt bath, by conveying butadiene and a halogen (chlorine) in a slow stream under the surface of carbon disulfide which fills about a half of a reaction tube.

Besides the fact that the use of a solvent, such as carbon disulfide, is not suitable for commercial operations because of higher costs caused by the necessity of vaporizing and recompressing the solvent to separate the reaction products, the execution of this halogen-addition reaction in the liquid phase effects the formation of undesirable saturated and other highly halogenated products. Thus, when butadiene is chlorinated in the liquid phase or in the presence of a liquid film, the yield of unsaturated dichlorides is quite low, due at least in part to the formation of tetrachlorbutane, and other highly chlorinated products. These latter substances are less valuable than the unsaturated dichlorides which may be converted substantially quantitatively into such valuable products as chloroprene (2-chlorobutadiene-1,3). Chloroprene may be readily polymerized to give an artificial rubber which is superior to ordinary rubber, for example, in its insolubility in hydrocarbons of the type of petroleum products.

It is therefore the main object of the present invention to obviate the above and other defects, and to provide a novel process for partially halogenating, via addition, butadiene and its homologues. Other specific objects of the invention will appear hereinafter.

It was stated above that, when the halogenation of unsaturated non-aromatic hydrocarbons having two or more olefinic linkages, and particularly of butadiene and of its homologues having conjugated double bonds or olefinic linkages, is effected in the liquid phase or in the presence of a liquid film, the yield of unsaturated polyhalides, such as unsaturated dihalides, is quite low. Without any intention of being limited by any theory of the case, it is believed at the present time that this low yield of the desired unsaturated dihalides is due both to the polymerization of the primary material subjected to the halogenation, and to a rapid halogenation of the unsaturated dihalides in the liquid phase.

It has now been discovered that both the polymerization of the primary material and the formation of saturated polyhalides may be materially inhibited, and the production of the desired unsaturated polyhalides thereby promoted, by effecting the halogenation in a truly vapor phase and in the presence of the halogen in an amount or concentration insufficient to completely saturate the primary material. Such vapor phase reaction favors the formation of the unsaturated polyhalides, and must be effected at elevated temperatures above those at which a liquid film may be formed, as by the condensation of the reaction product. As to the upper limit of the temperature range, this should be below that at which substantial substitutive halogenation occurs. This optimum temperature range will vary with the primary material which is to be subjected to partial halogenation in accordance with the present invention, and will also depend on other conditions, such as the specific halogen employed, the reaction products desired, pressure used, molal ratio of halogen to primary material, etc. Thus, when butadiene-1,3 is to be chlorinated, via addition, to produce the two isomeric unsaturated dichlorides, 1,2-dichlorbutene-3 and 1,4-dichlorbutene-2, the vapor phase chlorination, if realized at atmospheric pressure, should be preferably effected above about 150° C., below which temperature the higher boiling of the two isomers, namely 1,4-dichlorbutene-2, is in the liquid phase. As to the upper limit, this chlorination of butadiene should be preferably realized below about 300° C., since above this temperature the chlorination is predominantly by substitution and not via addition.

The mol ratio of the halogen to the unsaturated poly-olefin is important in that it is necessary to prevent the use of the halogen in quantities which would tend to form saturated polyhalide hydrocarbons. In the case of the halogenation of dienes to produce unsaturated dihalides according to the present invention, this ratio should not be lower than 2 mols of the olefin per mol of the halogen. Preferably, lower halogen concentrations should be employed. Thus, a 1:4 mol ratio of chlorine to butadiene was found to produce good yields of the aforementioned two isomeric unsaturated dichlorides. This ratio may be varied within relatively wide limits, it being noted that the quantity of the halogen should always be insufficient to completely saturate the primary poly-olefin. In fact, it is frequently advantageous to split the halogen stream, and to inject the halogen at several points along the path of the primary material through the reaction zone. When coupled with agitation, such step-wise addition of the halogen is further advantageous in that it decreases local concentration of the halogen, thus further inhibiting the formation of saturated polyhalides. The formation of the saturated polyhalides is undesirable since it not only decreases the potential yield of the unsaturated halides, but also may form a liquid film, the presence of which, in turn, will decrease the yield of the desired unsaturated polyhalides.

Representative unsaturated non-aromatic organic compounds having two or more olefinic linkages which may be partially halogenated by addition, in accordance with the process of the present invention, to form unsaturated polyhalides, such as unsaturated dihalides, comprise the aliphatic poly-olefins, cyclic non-aromatic dienes and aliphatic poly-olefins and cyclic dienes containing cycloalkyl and/or aromatic radicals linked to carbon atoms of secondary and/or tertiary character. As suitable aliphatic or straight chain poly-olefins, reference may be made to straight chain dienes which include allene and its homologues in which the double bonds are attached to the same carbon atom; the diolefins with conjugated double bonds, such as butadiene-1,3, 2-methyl butadiene-1,3 (isoprene), 2,3-dimethyl-butadiene-1,3 and the like, and their homologues and analogues; and the dienes in which the double bonds are separated by at least two single linkages such as pentadiene-1,4, hexadiene-1,5, 2-methyl-hexadiene-1,5, diisobutenyl and the like, their homologues and analogues. Compounds having more than two double bonds such as butatriene and the like, are also suitable compounds which may be partially halogenated, according to the present invention. As to the cyclic non-aromatic dienes, representative compounds include cyclopentadiene, cyclohexadienes, and the like. The straight chain poly-olefins and the cyclic diolefins may have cycloalkyl and/or aromatic radicals linked to carbon atoms of secondary and/or tertiary character, examples of such compounds being cyclopentyl butadiene, cyclopentyl pentadiene, cyclohexyl butadiene, 1-phenyl butadiene and the like, and their homologues and analogues.

The invention may therefore be stated to reside in a process of partially halogenating, by addition, the unsaturated non-aromatic organic compounds defined hereinabove, by executing the reaction in the presence of a halogen in an amount insufficient for complete saturation of the unsaturated compound or compounds, and under such conditions that no liquid phase of reactants and/or halogenated reaction products is present in the reaction zone. This obviates the formation of excessive quantities of saturated halogenated compounds, while the desired halogen addition reaction proceeds relatively rapidly to produce substantial quantities of the desired unsaturated halogenated product, namely, the desired unsaturated dihalide. The invention further includes the process of the type described hereinabove, wherein the reaction is realized at elevated temperatures above those at which a liquid phase of reactants or chlorinated reaction products is present in the reaction zone, but below the temperatures at which substantial halo-substitution occurs.

As noted, the optimum temperature range varies within relatively wide limits, depending on such variables as, for example, the particular unsaturated organic compound treated, halogen employed, the ratios of the halogen to the primary material treated, apparatus employed, etc. The minimum temperature at which the process can be executed with no liquid phase or no liquid film present in the reaction zone, is dependent primarily on the boiling temperature (under the pressure existing in the reaction zone) of the partially halogenated reaction products formed, and upon the ratio of the primary material to the halogen introduced into the reaction zone. If a certain minimum temperature is found, for example, for a given ratio of halogen to the unsaturated non-aromatic organic compound having two or more double bonds, increasing this ratio (i. e., increasing the molal quantity of the primary material per mol of halogen) in the reaction zone will, in general, decrease this minimum temperature and permit operation at a lower temperature while still avoiding the deposition of a liquid phase or film in the reaction zone. The particular manner in which the partial halo-addition reaction is effected may also be a factor affecting the minimum temperature at which the process may be realized without the presence of a liquid phase in the reaction zone. Thus, if the gaseous primary material and the gaseous halogen are passed into a reaction zone which is neither heated nor cooled, portions of the reaction zone may be below the minimum temperature at which a liquid phase may be formed, while other portions of the reactor may be at considerably higher temperatures, due to the exothermocity of the halo-addition reaction. In such cases, the liquid phase formed and deposited in the portion of the reaction zone which is at the low temperature, may be carried over and deposited in the higher temperature portions of the reaction zone and exist therein at a temperature higher than the temperature at which a liquid phase would be deposited if the entire reaction zone were maintained at a constant temperature. Once a liquid film has been deposited or formed within the reaction zone, it is only removed therefrom extremely slowly, probably because of the formation of higher boiling and possibly saturated halogenated products which require a relatively very high temperature for their removal, as compared to the temperature required for the maintenance in a gaseous phase of the unsaturated dihalides produced by the vapor phase halogen addition according to the present invention and in the complete absence of a liquid phase or film. In view of the above, it is preferable to execute the reaction in a reactor provided with suitable heating and/or cooling means, such as a constant temperature bath, so that the temperature throughout the reaction zone is kept substantially constant and above the minimum temperature at which a liquid phase can be deposited or exist in the reaction zone, under the prevailing operating conditions.

As to the upper temperature limit, it must not exceed the temperature at which substantial halo-substitution occurs, since otherwise the reaction products will predominate in the undesirable products of such halo-substitution, instead of the desirable products of partial halo-addition. Thus, if the operating temperature is above about 300° C., the vapor phase chlorination of butadiene would cause the formation of relatively large percentages of monochlorobutadiene instead of the desired dichlorbutenes. Obviously, this upper temperature limit will also vary, depending on the specific unsaturated poly-olefin treated, as well as on the other variables employed.

Since the halogens and the poly-olefinic compounds of the character herein described will react relatively rapidly when brought in contact at ordinary temperatures at which a liquid phase or liquid film may be present, thereby forming the undesirable saturated halides, it is necessary that the reactants be brought together at an elevated temperature at which no liquid film or phase will exist or be formed. Mixing the reactants at atmospheric temperatures and the passing of the mixture into a heated reaction zone will not suffice, because the halogenation reaction will take place to a substantial extent before such heating is accomplished, with the result that the halogenation reaction occurs in the presence of the liquid film or phase. This in turn effects the formation of the saturated poly-halides. Therefore, the reactants man be preferably brought into contact at temperatures sufficiently high to substantially obviate the presence of the liquid film. This may be effected in a variety of suitable manners. Both the unsaturated non-aromatic poly-olefin and the halogen may be separately preheated to the desired temperature, and be then commingled at such temperature substantially immediately prior to the injection of the mixture into the reaction zone. In the alternative, one or the other of the reactants may be thus preheated to an optimum temperature and be then commingled with the other reactant, which is not preheated. Since the halogen, such as chlorine or bromine, is highly reactive at elevated temperatures and since such heated halogen, when present in sufficient concentrations, reacts with metallic surfaces to form metal halides, it is preferable to effect the preheating, and frequently the mixing of the preheated halogen with the unsaturated non-aromatic organic compound of the described class in preheaters, mixers, etc., which do not have reactive metallic surfaces which may come in contact with such heated halogen. Therefore, in the preferred embodiments of the present invention, it is advantageous to employ halogen preheaters, mixers and/or reaction vessels which are constructed of or lined with materials substantially inert to the action of a heated halogen. As such, reference may be made to hard carbon, carborundum, non-reactive metallic alloys such as Hastelloy, quartz, etc. The use of apparatus constructed of or lined with such materials is further beneficial in that it prevents or greatly decreases the carbonization, tar formation, etc., which may occur when heated halogen and an unsaturated compound of the described class are brought together in an apparatus constructed of or lined with a metal which reacts with the heated halogen.

The process may be executed at any suitable pressure. For example, atmospheric pressure or a moderately elevated or reduced pressure may be employed. When treating relatively low boiling non-aromatic poly-olefins of the described class, it is preferable to operate at atmospheric and frequently at moderately elevated pressures. In some cases, particularly in the treatment of higher boiling poly-olefins, it may be desirable to operate under a reduced pressure, since the decreasing of the pressure in the reaction zone increases the vapor pressure of the halogenated reaction product and thus decreases the minimum temperature at which the partial halogen addition reaction may be effected with no liquid phase present therein. Thus, with the higher poly-olefins, operation under a reduced pressure increases the temperature range in which the process may be effected with no liquid present in the reaction zone and with a minimum of halo-substitution into the poly-olefin to yield unsaturated mono-halides.

The optimum space velocity or rate of passage of the reaction mixture through the reaction zone will depend upon the design of the reaction chamber (amount of space available), upon the particular temperature employed and upon the mol ratio of the poly-olefin material to halogen. It will also depend on a method of introduction of the halogen into the reaction zone, as in the case where the halogen is injected at different points in the reaction zone. Generally, good results are obtained by employing the maximum flows that can be reacted in a given reactor. In order to obtain intimate contact, it is preferable to employ reactors filled with contact materials such as carbon chips.

The invention is illustrated by the following examples, which are presented for the purpose of showing various modes of executing the process and the results obtainable, and are not to be considered as limiting in any sense.

*Example I*

Butadiene-1,3 and chlorine were separately preheated to a temperature of about 150° C., and were then intimately commingled in a mol ratio of 4:1. The mixture was then conveyed through a reaction unit consisting of three tubes connected in series, each tube being 30 cm. long, having an internal diameter of 1.9 cm., filled with carbon chips passing through a 6 mesh sieve and retained on an 8-mesh sieve. The rate of flow of the gaseous mixture was such that 1.26 gm. of chlorine were introduced per minute. The reactors were placed in an oil bath maintained at 150° C. This allowed the reaction temperature to be maintained between about 150° C. and 190° C. An analysis of the reaction products showed that the yield of the two dichlorbutenes recovered was about 70 mol per cent based on the chlorine applied. It is to be noted that the actual yield of these unsaturated dihalides was considerably higher than indicated by the above figure. Due to the use of an inefficient recovery system, a relatively large handling loss was noticed and not all of the product was recovered. There was also no noticeable addition of hydrogen chloride to the butadiene, the presence of neither 1-chlorbutene-2 or 2-chlorbutene-3 being detected in the reaction product. The principal product boiling in this range was the mono-chlordiolefin, 1-chlorbutadiene-1,3, formed by substitution of chlorine into the butadiene. The tabulated data show the yields obtained:

| Reaction product | Yield in mol per cent of chlorine applied |
| --- | --- |
| Monochlor-diolefins | 2.4 |
| 1,2-dichlorbutene-3 | 54.8 |
| 1,4-dichlorbutene-2 | 15.2 |
| 1,2,3,4-tetrachlor butane | 4.8 |
| Polymer | 2.1 |

Example II

The reactor consisted of three reaction tubes each 36 inches long and having an internal diameter of 1.5 inches. The tubes were connected in series and were packed with 4–6 mesh graphite chips. The reactor tubes were wound with resistance wire heaters and insulated with pipe lagging. At the entrance into the first tube, a carbon block preheater and mixing jet was arranged, thus allowing separate preheating of the primary material (butadiene) and of chlorine prior to their commingling and interaction. The other two reactors were also provided with means for injecting preheated chlorine directly into each of these reaction tubes.

The chlorine was introduced continuously in equal proportions into each of the reactors, the total being about 6.6 gm./min. The overall mol ratio of the butadiene to the chlorine introduced was 3.8:1. In other words, the ratio of the butadiene-chlorine stream entering the first tube was 11.4:1. The butadiene and chlorine were first separately preheated in the carbon block to a temperature of about 160° C., and, after commingling, were conveyed through the first packed reaction tube. At the entrance into the second tube, the mixture met and was commingled with the second chlorine stream (introduced at a rate of 2.2 gm./min.). The mixture in this tube was maintained at a temperature of about 180°–185° C. The final addition of chlorine was effected at the entrance into the third tube, this chlorine stream also being introduced at a rate of 2.2 gm./min. The third reactor was maintained at about 160°–170° C. The reaction products leaving this tube were then conveyed to a recovery system, and were analyzed. As will be seen from the following table, the main reaction product comprised the two dichlorbutenes discussed above.

*Yield of products on chlorine applied*

|  | Mol. per cent |
| --- | --- |
| 1-chlorbutadiene-1,3 | 4.3 |
| 1,2-dichlorbutene-3 | 47.1 |
| 1,4-dichlorbutene-2 | 26.8 |
| 1,2,3,4-tetrachlorbutane | 13.5 |

As in the previous example, the above data represents the yields obtained. However, by operating with better equipment it is possible to increase the yields so that instead of obtaining 74 mol. per cent. of the unsaturated dichlorides (based on the chlorine applied), the yield will be about 80 mol. per cent., and even higher.

Example III

In order to compare the yields of unsaturated dichlorides obtained by operating according to the present invention with those produced by effecting the chlorine addition in the liquid phase, several tests were realized wherein butadiene was chlorinated by maintaining the diolefin in a liquid state and by bubbling chlorine therethrough. Although the ultimate ratio of the butadiene to the introduced chlorine was about the same as that employed in the preceding two examples (i. e., about 4 to 1), the yield of the unsaturated dichlorides was comparatively very low, never exceeding about 10% based on the chlorine introduced. These comparatively poor results or yields were obtained both in the case when the reaction was effected in the liquid phase in the presence of small quantities of oxygen (or of an oxygen-containing gas), and in cases wherein such reaction was realized in the absence of oxygen. In all of these reactions wherein a liquid phase or film was present in the reaction zone, the principal product obtained was a non-volatile chlorine-containing polymer. Also, only very small amounts of hydrogen chloride were produced, indicating negligible chlor-substitution or induced chlor-substitution.

In other experiments, butadiene was chlorinated in a continuous tubular reactor in the deliberate presence of a liquid film. This was realized by effecting the reaction at a temperature at which at least a portion of the reaction products are liquefied. The yield of the unsaturated dichlorides was found to be very low, the reaction products predominating in terachlorbutane and other highly chlorinated products. It is now believed that this may be attributed to a comparatively rapid chlorination of unsaturated dichlorides in the liquid film, while the butadiene in the gas phase passes through the reaction zone relatively unchanged.

The carbon chips were employed in the above examples for the purpose of increasing the contact surface. Instead of this material, it is possible to use any porous material which has a large surface per unit weight of the material. As examples, calcium chloride or activiated gels may be mentioned. When the surface becomes too great, the reaction will frequently be quite violent with the result that the temperature rise may be excessive. In such a case it is possible, and even preferable, to add the halogen at relatively small rates at a plurality of points along the path of the poly-olefin through the reaction zone. The insufficiency or relatively low concentration of the halogen will then prevent excessively high temperatures. As an alternative, it is also possible to control the temperature by internal or external cooling of the reaction tube, or any portion thereof, by any of the well known methods and/or means usually employed therefor.

Although the reactions described in the examples were effected with an overall diolefin-chlorin mol. ratio of about 4:1, this ratio may vary within a relatively wide range as long as the quantity of chlorine is insufficient to saturate the diolefin or poly-olefin subjected to the vapor phase chlorination, via addition, in accordance with the process of the present invention. Obviously with higher poly-olefin to halogen ratios, there will be less chance of the formation of saturated poly-halides. However, too high a ratio will result in a reaction product containing unreacted poly-olefins.

The invention may be executed in an intermittent or continuous manner. The space velocity or rate of passage of the reactants through the reaction zone will depend upon a number of variables, such as type of reactants, design of reaction chamber, manner of halogen addition, temperatures employed, mol ratio of the reactants, etc. In general, good results are obtained by employing the maximum flow which may be reacted in a given reactor.

Although the examples were specific to the chlorination of butadiene, the invention includes the use of other halogens, such as bromine, as well as of the various poly-olefinic compounds described hereinabove.

Although the invention has been described with particular reference to the halogenation of non-aromatic poly-olefins, such as dienes having the general formula

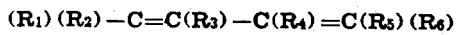

in which the R₁, R₂, R₃, R₄, R₅ and R₆ are hydrogen or alkyl, aryl or aralkyl groups or radicals, it is to be understood that the invention is also adapted to the halogenation, via addition, of halogenated analogues of the outlined poly-olefins. As representative examples of such partially halogenated unsaturated organic compounds having two or more olefinic linkages reference may be made to 2-chlor-butadiene-1,3 (chloroprene), 1-chlor-butadiene-1,3, 2-chlormethyl-butadiene-1,3, other partially halogenated isoprene analogues, and the like, and their homologues and analogues. As in the case of the poly-olefins, these halogenated poly-olefins may be further halogenated, via addition, by effecting the halogenation reaction in the vapor phase, in the complete and continuous absence of a liquid film, and with such a mol ratio of halogen to the halogenated poly-olefins that the halogen will not be able to completely saturate the partially halogenated poly-olefins. The reaction temperature must be below that at which substantial halo-substitution occurs.

We claim as our invention:

1. In a continuous process of converting butadiene-1,3 into a mixture of chlorinated hydrocarbons predominating in 1,2-dichlorbutene-3 and 1,4-dichlorbutene-2, the steps of heating the butadiene-1,3 to a temperature of between about 150° C. and 300° C. continuously conveying said preheated butadiene through a reaction zone, continuously introducing preheated chlorine into the stream of butadiene at a plurality of points along the path of said butadiene through said reaction zone, said chlorine being introduced in a quantity insufficient to completely saturate the butadiene, maintaining the butadiene-chlorine mixture in said reaction zone at a temperature of between about 150° C. and 300° C., and continuously withdrawing the reaction products from the reaction zone.

2. The process according to claim 1, wherein the overall mol ratio of butadiene-1,3 to chlorine is maintained above about 2 to 1, thereby inhibiting the complete saturation of the butadiene and the formation of high boiling saturated compounds.

3. The process according to claim 1, wherein the butadiene-chlorine mixture is brought in the reaction zone in contact with a material having a relatively large surface per unit weight, thereby increasing the contact area in said reaction zone and aiding the chlor-addition reaction.

4. In a process of converting butadiene-1,3 into a mixture of chlorinated hydrocarbons predominating in 1,2-dichlorbutene-3 and 1,4-dichlorbutene-2, the steps of commingling the butadiene-1,3 and the chlorine in a vapor phase and in the complete and continuous absence of a liquid film in a mol ratio insufficient to effect the saturation of the butadiene, and effecting the reaction between said reactants at a temperature of between about 150° C. and 300° C., whereby the formation of a liquid film is avoided and the production of chlor-substituted hydrocarbons substantially inhibited.

5. The process according to claim 4, wherein at least one of the reactants is preheated substantially to the reaction temperature prior to the commingling step to avoid the formation and presence of a liquid film in the reaction zone.

6. In a process of partially halogenating a butadiene via addition, the steps of commingling a butadiene with a halogen of the group consisting of chlorine and bromine in the vapor phase in the complete and continuous absence of a liquid film and in quantities insufficient to effect the complete halogenation of the butadiene, and effecting the halo-addition reaction at a temperature above that at which condensation of the product occurs but below that at which substantial halo-substitution into butadiene is effected.

7. In a process for effecting the chlorination of an aliphatic conjugated double bond diolefin to a corresponding dichloro mono-olefin by reacting the diolefin with chlorine in an amount insufficient to effect complete saturation of the diolefin, the method of inhibiting the formation of saturated chlorinated products which comprises effecting the chlorination reaction in the vapor phase in the initial and continuous absence of a liquid phase in the reaction zone maintained throughout at a temperature sufficiently high to preclude the formation of a liquid phase therein but below the temperature at which substantial chlor-substitution of the diolefin occurs.

8. In a process for effecting the halogenation of an aliphatic conjugated double bond diolefin to a corresponding dihalo mono-olefin by reacting the diolefin with a halogen of the group consisting of chlorine and bromine in an amount insufficient to effect complete saturation of the diolefin, the method of inhibiting the formation of saturated halogenated products which comprises effecting the halogenation reaction in the initial and continuous absence of a liquid phase in the reaction zone maintained throughout at a temperature sufficiently high to preclude the formation of a liquid phase therein but below the temperature at which substantial halo-substitution of the diolefin occurs.

9. In a process for effecting the halogenation of a diolefinic organic compound of the group consisting of the aliphatic and cycloaliphatic conjugated double bond diolefins to a corresponding dihalo mono-olefinic organic compound by reacting the diolefinic organic compound with a halogen of the group consisting of chlorine and bromine in an amount insufficient to effect complete saturation of the diolefinic compound, the method of inhibiting the formation of saturated halogenated products which comprises effecting the halogenation reaction in the vapor phase in the initial and continuous absence of a liquid phase in the reaction zone maintained throughout at a temperature sufficiently high to preclude the formation of a liquid phase therein but below the temperature at which substantial halo-substitution of the diolefinic organic compound occurs.

10. The process according to claim 9, wherein the halogen employed is chlorine.

GEORGE W. HEARNE.
DONALD S. LA FRANCE.